United States Patent
Honda et al.

(10) Patent No.: US 11,238,673 B2
(45) Date of Patent: Feb. 1, 2022

(54) AUTOMATIC INSPECTION SYSTEM AND METHOD FOR CONTROLLING AUTOMATIC INSPECTION SYSTEM

(71) Applicant: Hitachi, Ltd., Tokyo (JP)

(72) Inventors: Jumpei Honda, Tokyo (JP); Takuma Nishimura, Tokyo (JP); Hiroshige Kashiwabara, Tokyo (JP); Hidemasa Nakai, Tokyo (JP); Yuichi Igarashi, Tokyo (JP); Ryo Nakano, Tokyo (JP)

(73) Assignee: HITACHI, LTD., Tokyo (JP)

( * ) Notice: Subject to any disclaimer, the term of this patent is extended or adjusted under 35 U.S.C. 154(b) by 181 days.

(21) Appl. No.: 16/617,663

(22) PCT Filed: Apr. 17, 2018

(86) PCT No.: PCT/JP2018/015890
§ 371 (c)(1),
(2) Date: Nov. 27, 2019

(87) PCT Pub. No.: WO2018/221046
PCT Pub. Date: Dec. 6, 2018

(65) Prior Publication Data
US 2020/0090424 A1    Mar. 19, 2020

(30) Foreign Application Priority Data

Jun. 2, 2017  (JP) .............................. JP2017-110157

(51) Int. Cl.
*G07C 5/00* (2006.01)
*H04L 12/733* (2013.01)
(Continued)

(52) U.S. Cl.
CPC ............. *G07C 5/008* (2013.01); *G07C 5/006* (2013.01); *H04L 45/122* (2013.01)

(58) Field of Classification Search
USPC ....................................................... 701/31.4
See application file for complete search history.

(56) References Cited

U.S. PATENT DOCUMENTS

| 2003/0061005 A1* | 3/2003 | Manegold | ................ G08G 1/20 |
| | | | 702/182 |
| 2006/0081697 A1* | 4/2006 | Brinton | .................. G07C 5/008 |
| | | | 235/377 |

(Continued)

FOREIGN PATENT DOCUMENTS

| JP | 07-198331 A | 8/1995 |
| JP | 2009-282627 A | 12/2009 |

(Continued)

OTHER PUBLICATIONS

International Search Report of PCT/JP2018/015890 dated May 22, 2018.

*Primary Examiner* — Tyler D Paige
(74) *Attorney, Agent, or Firm* — Mattingly & Malur, PC

(57) ABSTRACT

An inspection target reading device includes a wireless slave station that performs communication via a wireless network, a measurement unit that measures a state of an inspection target, and an analysis unit that generates measurement data, and transmits the measurement data from the wireless slave station via the wireless network. An automatic inspection system includes a wireless master station that communicates with each inspection target reading device via the wireless network, a data acquisition unit that acquires the measurement data from each inspection target reading device through a wireless master station, a data storage unit that stores the measurement data, a determination condition storage unit that stores determination conditions related to the measurement data, and an inspection unit that outputs predetermined measurement data selected from the stored measurement data and a predetermined determination con- (Continued)

dition corresponding to the predetermined measurement data among the stored determination conditions in association with each other.

5 Claims, 15 Drawing Sheets

(51) Int. Cl.
*G07B 15/02* (2011.01)
*G05B 23/02* (2006.01)
*G08C 17/00* (2006.01)
*H04Q 9/00* (2006.01)

(56) References Cited

U.S. PATENT DOCUMENTS

| 2009/0237245 A1* | 9/2009 | Brinton | G07C 5/008 |
| | | | 340/540 |
| 2015/0102940 A1* | 4/2015 | Keech | G05B 19/0423 |
| | | | 340/870.02 |
| 2020/0090424 A1* | 3/2020 | Honda | G07C 5/008 |

FOREIGN PATENT DOCUMENTS

| JP | 2012-208763 A | 10/2012 |
| JP | 2015-109596 A | 6/2015 |
| JP | 2016-201606 | 12/2016 |
| JP | 2017-054391 A | 3/2017 |

* cited by examiner

FIG. 3

SENSOR MANAGEMENT TABLE T1

| SENSOR ID (C10) | SENSOR TYPE (C11) | INSPECTION TARGET (C12) | UNIT (C13) | INSTALLATION LOCATION (C14) |
|---|---|---|---|---|
| SID1 | CAMERA | PRESSURE GAUGE | Pa | CONTROL PANEL Bx1 |
| SID2 | CAMERA | THERMOMETER | °C | CONTROL PANEL Bx2 |
| SID3 | LEVEL SENSOR | LIQUID LEVEL GAUGE | mm | TANK TK1 |
| SID4 | COLOR SENSOR | COLOR OF DESICCANT | BLUE/WHITE | TANK TK2 |
| SID5 | CURRENT SENSOR | DIGITAL AMMETER | mA | CONTROL PANEL Bx3 |
| ... | ... | ... | ... | ... |

FIG. 4

DETERMINATION CONDITION MANAGEMENT TABLE T2

| DISPLAY UNIT ID (C20) | INSTALLATION LOCATION (C21) | ACQUISITION DATE (C22) | DETERMINATION CONDITION (C23) |
|---|---|---|---|
| PID1 | CONTROL PANEL Bx11 | Time1 | JC1 |
| PID2 | CONTROL PANEL Bx12 | Time2 | JC2 |
| PID3 | CONTROL PANEL Bx13 | Time3 | JC3 |
| ... | ... | ... | ... |

FIG. 5

| INSPECTION DETERMINATION RESULT DISPLAY TABLE T3 | | |
|---|---|---|
| C30 | C31 | C32 |
| DISPLAY UNIT ID | VERTICAL AXIS SENSOR ID | HORIZONTAL AXIS SENSOR ID |
| PID1 | SID11 | SID12 |
| PID2 | SID21 | SID22 |
| PID3 | SID31 | — |
| PID4 | — | SID32 |
| PID5 | SID51 | SID52 |
| ... | ... | ... |

FIG. 14

| RETRY CONTROL TABLE 270 | | | |
|---|---|---|---|
| 2701 | 2702 | 2703 | 2704 |
| FAILURE CAUSE | INFLUENCE RANGE | INFLUENCE PERIOD | COPING METHOD |
| DROPLET SUCH AS RAIN OR CONDENSATION | MULTIPLE METERS | SERVER HOURS TO SEVERAL DAYS | ·STEPWISE RETRY ·ALARM OUTPUT |
| LIGHT OR SHADOW | MULTIPLE METERS | SEVERAL HOURS | ·STEPWISE RETRY ·ALARM OUTPUT |
| ATTACHMENT OF FOREIGN MATTER | ONE OR SEVERAL METERS | UNTIL FOREIGN MATTER IS REMOVED | ·ALARM OUTPUT |

AUTOMATIC INSPECTION SYSTEM AND METHOD FOR CONTROLLING AUTOMATIC INSPECTION SYSTEM

TECHNICAL FIELD

The present invention relates to an automatic inspection system and a method for controlling an automatic inspection system.

BACKGROUND ART

Meters such as flow meters or power meters installed in plants such as factories and substations are inspected by visual inspection by a user at a frequency of about several times to a dozen times a day. The user within a control room can remotely confirm a meter value by capturing an image of a meter to be inspected with a camera and transmitting the captured image to a center (PTL 1, PTL 2, and PTL 3).

In a wireless metering system, a technology for suppressing an increase in communication time by classifying and determining a cause of the communication failure and performing a retry for each classification by batch communication when communication between a portable wireless device and a wireless slave station fails is also known (PTL 4).

CITATION LIST

Patent Literature

PTL 1: JP 2012-208763 A
PTL 2: JP 2017-054391 A
PTL 3: JP H07-198331 A
PTL 4: JP 2009-282627 A

SUMMARY OF INVENTION

Technical Problem

According to PTL 1 to PTL 3, efficiency of a metering operation is improved by reading the meter value with the camera and transmitting the read meter value to the center. However, it is not possible to determine whether or not the meter value indicates a normal state by merely using the meter value. For example, in each control panel within the plant, a panel for displaying a determination condition indicating whether or not the meter value indicates the normal state may be installed near the meter to be inspected. A user who circulates and inspects a plant site visually reads the meter value, confirms the determination condition displayed on the panel, and determines whether or not the meter value indicates the normal state.

As stated above, the user who circulates the site needs to visually confirm not only the meter value but also the determination condition displayed on the panel, and thus, time and effort are required for the inspection operation. Even when the meter value is read by the camera and is remotely monitored by a monitor within the control room, the user within the control room needs to not only visually look at the meter value image-captured by the camera on the monitor but also determine whether or not the meter value indicates the normal state while referring to the determination condition corresponding to the meter value.

As described above, for example, when the meter in the site in which the determination condition such as an upper limit value and a lower limit value are set is remotely inspected, since it is necessary to confirm not only the meter value but also the determination condition, it is necessary to improve the efficiency of the inspection operation.

PTL 4 merely illustrates a technology for collecting metered values through wireless communication, and is not a technology for transmitting measurement data through a multi-hop wireless network but merely a technology for enabling a transmission source and a reception destination to directly communicate.

The present invention has been made in view of the above-described problems, and an object of the present invention is to provide an automatic inspection system and a method for controlling an automatic inspection system which are capable of improving efficiency of an inspection operation. Another object of the present invention is to provide an automatic inspection system and a method for controlling an automatic inspection system which are capable of realizing improvement in efficiency of an inspection operation and power saving.

Solution to Problem

In order to solve the above-described problems, an automatic inspection system according to the present invention is an automatic inspection system that collects and inspects data from a plurality of inspection target reading devices connected via a wireless network. Each inspection target reading device includes a wireless slave station that performs communication via the wireless network, a measurement unit that measures a state of an inspection target, and an analysis unit that analyzes a measurement result of the measurement unit, and generates measurement data, and the measurement data generated by the analysis unit is transmitted from the wireless slave station via the wireless network. The automatic inspection system according to the present invention includes a wireless master station that performs communication with each inspection target reading device via the wireless network, a data acquisition unit that acquires the measurement data from each inspection target reading device through the wireless master station, a data storage unit that stores the acquired measurement data, a determination condition storage unit that stores determination conditions related to the measurement data, and an inspection unit that outputs predetermined measurement data selected from the pieces of measurement data stored in the data storage unit and a predetermined determination condition corresponding to the predetermined measurement data among the determination conditions stored in the determination condition storage unit in association with each other.

Advantageous Effects of Invention

According to the present invention, the inspection unit can output the predetermined measurement data selected from the pieces of measurement data stored in the data storage unit and the predetermined determination condition corresponding to the predetermined measurement data among the determination conditions stored in the determination condition storage unit in association with each other. Accordingly, efficiency of an inspection operation is improved.

BRIEF DESCRIPTION OF DRAWINGS

FIG. 3 is an explanatory diagram illustrating an example of a table for managing sensors.

FIG. 4 is an explanatory diagram illustrating an example of a table for managing a determination condition display unit.

FIG. 5 is an explanatory diagram illustrating an example of a table for managing a display method of an inspection determination result.

FIG. 14 is an example of a table for controlling a retry according to a failure cause of measurement.

DESCRIPTION OF EMBODIMENTS

Figure 1:
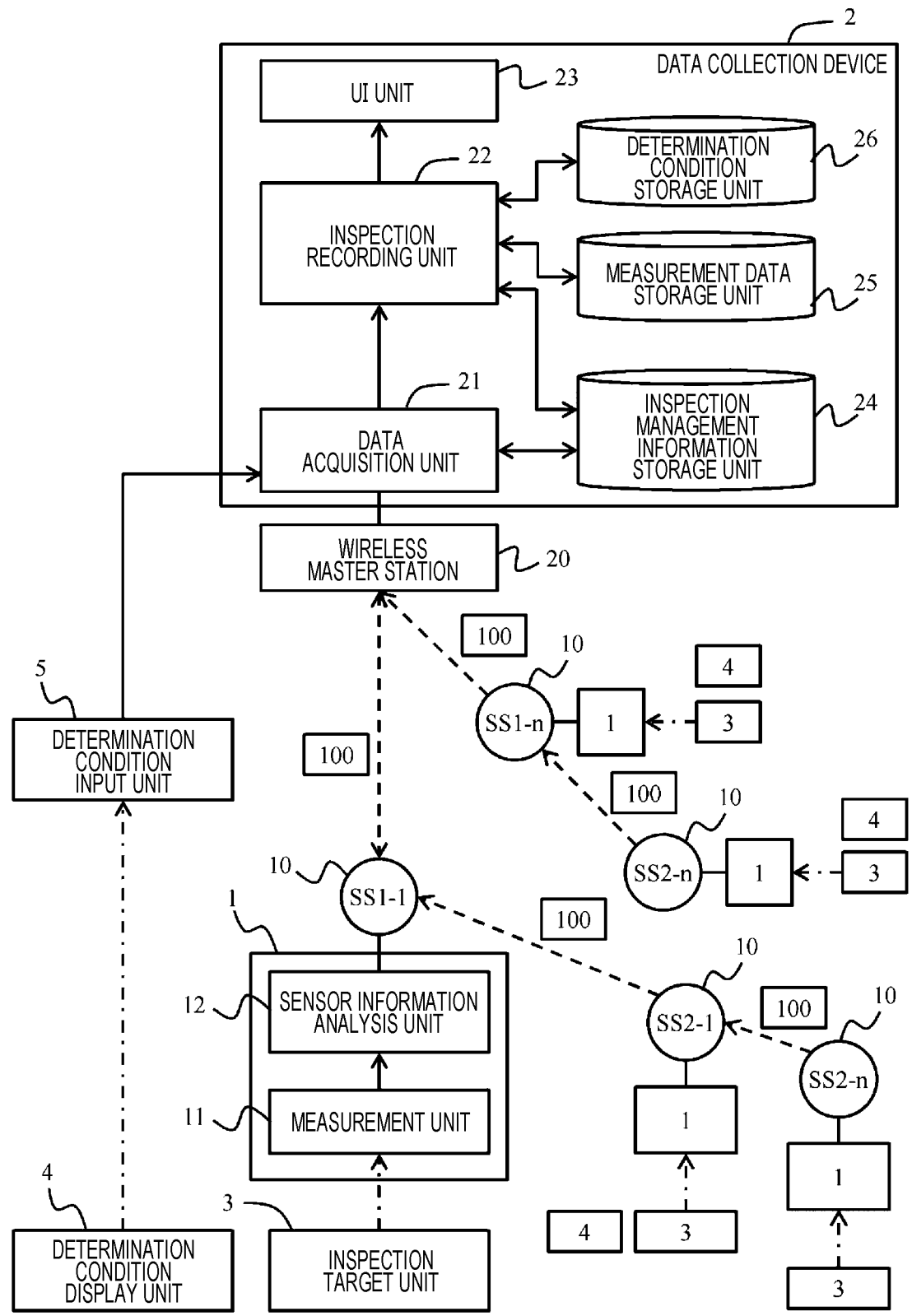
FIG. 1 is an overall view of an automatic inspection system.

Hereinafter, embodiments of the present invention will be described with reference to the drawings. In the present embodiment, not only data obtained by measuring the inspection target, but also determination conditions related to the measurement data and the measurement data are output in association with each other. Thus, a user can simply confirm whether or not the measurement data is appropriate for the determination condition, and the efficiency of an inspection operation is improved.

In the present embodiment, the measurement is retried stepwise according to a cause when the measurement fails due to a surrounding environment in an automatic inspection system using a multi-hop sensor wireless network. Accordingly, it is possible to suppress power consumption of each wireless slave station.

First Embodiment

A first embodiment will be described with reference to FIGS. 1 to 9. In the present embodiment, an example in which an inspection target in a substation is automatically inspected will be described. Examples of the inspection target can include a color of a desiccant in addition to various instruments such as ammeters, voltmeters, pressure gauges, flow meters, level meters, thermometers, hygrometers, solar meters, and anemometers.

The automatic inspection system includes, for example, a plurality of reading devices 1 and at least one data collection device 2. The reading device 1 as an "inspection target reading device" is connected to an adjacent node (reading device 1 or data collection device 2) via, for example, a multi-hop wireless network.

The reading device 1 is, for example, an electronic circuit device that includes hardware resources such as a microprocessor, a memory, an input and output unit, and a battery (all not illustrated). The reading device 1 includes a measurement unit 11 and a sensor information analysis unit 12 as functions that use these hardware resources.

The reading device 1 further includes a wireless slave station 10. The wireless slave station 10 may be provided separately from the reading device 1 and electrically connected to the reading device 1 or may be provided inside the reading device 1.

The wireless slave station 10 is connected to another wireless slave station 10 or the data collection device 2 via the multi-hop wireless network, and transfers packets by a so-called bucket relay system. A data size of the packet is as small as several kilobytes. Since the data collection device 2 needs to periodically collect data from the plurality (usually a large number) of wireless slave stations 10, a packet size is preferably as small as possible.

When a data transmission request from the data collection device 2 is received, the wireless slave station 10 activates the reading device 1 from a sleep state, and reads a meter value. When data 100 including the meter value read by the reading device 1 is transmitted to the data collection device 2, the wireless slave station 10 transitions the reading device 1 to the sleep state.

The measurement unit 11 captures an image of an inspection target unit 14 such as a meter by using a camera (not illustrated), reads the image-captured meter value, and outputs image data. The measurement unit 11 is not limited to the camera. For example, a current sensor that detects a current value, a color sensor that detects a color, a photoelectric sensor that detects light, a sound wave sensor that detects sound may be used. The measurement unit 11 outputs data (data before analysis) according to each purpose.

When the data is received from the measurement unit 11, the sensor information analysis unit 12 as an "analysis unit" generates measurement data 100 by analyzing the data. For example, the sensor information analysis unit 12 recognizes the meter value as a numerical value by recognizing image data captured by the camera, and outputs numerical data as the measurement data 100. Alternatively, the sensor information analysis unit 12 determines whether or not a color determined by the color sensor matches a target color within a predetermined error, and outputs, as the measurement data 100, data indicating that the colors match or mismatch.

For example, the determination condition display unit 4 is installed on a control panel so as to correspond to the inspection target unit 3. For example, the determination condition display unit 4 displays a condition for determining that a state of the inspection target unit 3 is a normal state, such as an upper limit value and a lower limit value that define a range of the normal state.

The determination condition display unit 4 may be associated with one inspection target unit 3, or may be associated with a plurality of inspection target units 3. For example, the determination condition display unit 4 may indicate an upper limit and a lower limit that define a normal range for a state (for example, a meter value) of one inspection target unit 3. Alternatively, the determination condition display unit 4 can indicate that a region determined from states of the plurality of inspection target units 3 is a normal state, such as a predetermined region determined by a meter value of an oil level meter and a meter value of an oil temperature meter.

The determination condition input unit 5 is a device that captures an image of the determination condition displayed on the determination condition display unit 4, and registers the image-captured determination condition in the data collection device 2. For example, the determination condition input unit 5 has a capturing function, an image data analysis function, and a function of transferring analysis result data. Alternatively, the determination condition input unit 5 may have only a function of capturing the image data and a function of transferring the image data, and the data collection device 2 or another device (not illustrated) may have a function of analyzing the image data.

The user circulates the determination condition display units 4 at a site, and acquires the determination conditions displayed on the determination condition display unit 4 by the determination condition input unit 5. The user stores the acquired determination condition in the data collection device 2 by connecting the determination condition input unit 5 to the data collection device 2.

A timing when the determination condition input unit 5 acquires the determination condition of the determination condition display unit 4 and registers the registered determination condition in the data collection device 2 is preferably earlier than a timing when the data collection device 2 collects the measurement data 100 of an inspection target from each reading device 1 and inspects the inspection target. However, the present invention is not limited thereto, and the determination condition may be registered in the data collection device 2 before an inspection recording unit 22 automatically determines an inspection result of a certain reading device 1.

As described above, the data collection device 2 regularly or irregularly collects and manages data from each reading device 1 connected by the multi-hop wireless network. Thus, the data collection device 2 includes a wireless master station 20.

The data collection device 2 is, for example, a computer or a dedicated electronic circuit device that includes hardware resources such as a microprocessor, a memory, an auxiliary storage device, and an input and output unit (all not illustrated) and software resources such as an operating system and a computer program.

For example, the data collection device 2 realizes functions such as a data acquisition unit 21, the inspection recording unit 22, a user interface unit (UI unit) 23, an inspection management information storage unit 24, a measurement data storage unit 25, and a determination condition storage unit 26 by using these hardware resources and software resources.

The data acquisition unit 21 is an example of a "measurement data acquisition unit". The data acquisition unit 21 is connected to the wireless master station 20. The data acquisition unit 21 regularly or irregularly acquires the measurement data 100 from all or a part of the reading devices 1 via the multi-hop wireless network under the control of the data collection device 2.

The inspection recording unit 22 is an example of an "inspection unit". The inspection recording unit 22 stores the measurement data (meter value) 100 collected by the data acquisition unit 21 in the measurement data storage unit 25. The inspection recording unit 22 may record only the normally read measurement data of the measurement data 100 in the measurement data storage unit 25. Accordingly, it is possible to prevent useless data from being stored, and thus, it is possible to effectively use a storage resource of the measurement data storage unit 25.

The inspection recording unit 22 outputs predetermined measurement data selected from the pieces of measurement data stored in the measurement data storage unit 25 and a predetermined determination condition corresponding to the predetermined measurement data among the determination conditions stored in the determination condition storage unit 26 in association with each other to the UI unit 23.

The UI unit 23 is a device that exchanges information between the automatic inspection system and the user. The UI unit 23 includes an information input unit and an information output unit (both not illustrated). Examples of the information input unit include a keyboard, a push button switch, a voice instruction device, a touch panel, and a pointing device such as a mouse. Examples of the information output unit include a display, a printer, and a voice synthesizer. The UI unit 23 may be provided within the data collection device 2, or may be a computer terminal separate from the data collection device 2. Examples of the separate computer terminal include a desktop personal computer, a laptop personal computer, a tablet personal computer, a mobile phone (including a so-called smartphone), and a portable information terminal.

The UI unit 23 displays information (the predetermined measurement data and the predetermined determination condition) input from the inspection recording unit 22 on a display by a method instructed by the inspection recording unit 22. Descriptions and determination results regarding all or a part of screen display contents may be output by voice. All or a part of the screen display contents may be transmitted to a remote manager by e-mail.

The inspection management information storage unit 24 stores management information necessary for automatic inspection. Examples of the inspection management information acquisition include a sensor management table T1 (see FIG. 3).

The measurement data storage unit 25 stores the measurement data 100 collected from each reading device 1 via the multi-hop wireless network.

The determination condition storage unit 26 stores the determination condition input from the determination condition input unit 5. The determination condition storage unit 26 stores a determination condition management table T2 to be described below with reference to FIG. 4. The determination condition storage unit 26 stores an inspection determination result display table T3 to be described below with reference to FIG. 5. The inspection determination result display table T3 may be stored, as a part of the inspection management information, in the inspection management information storage unit 24.

Figure 2:
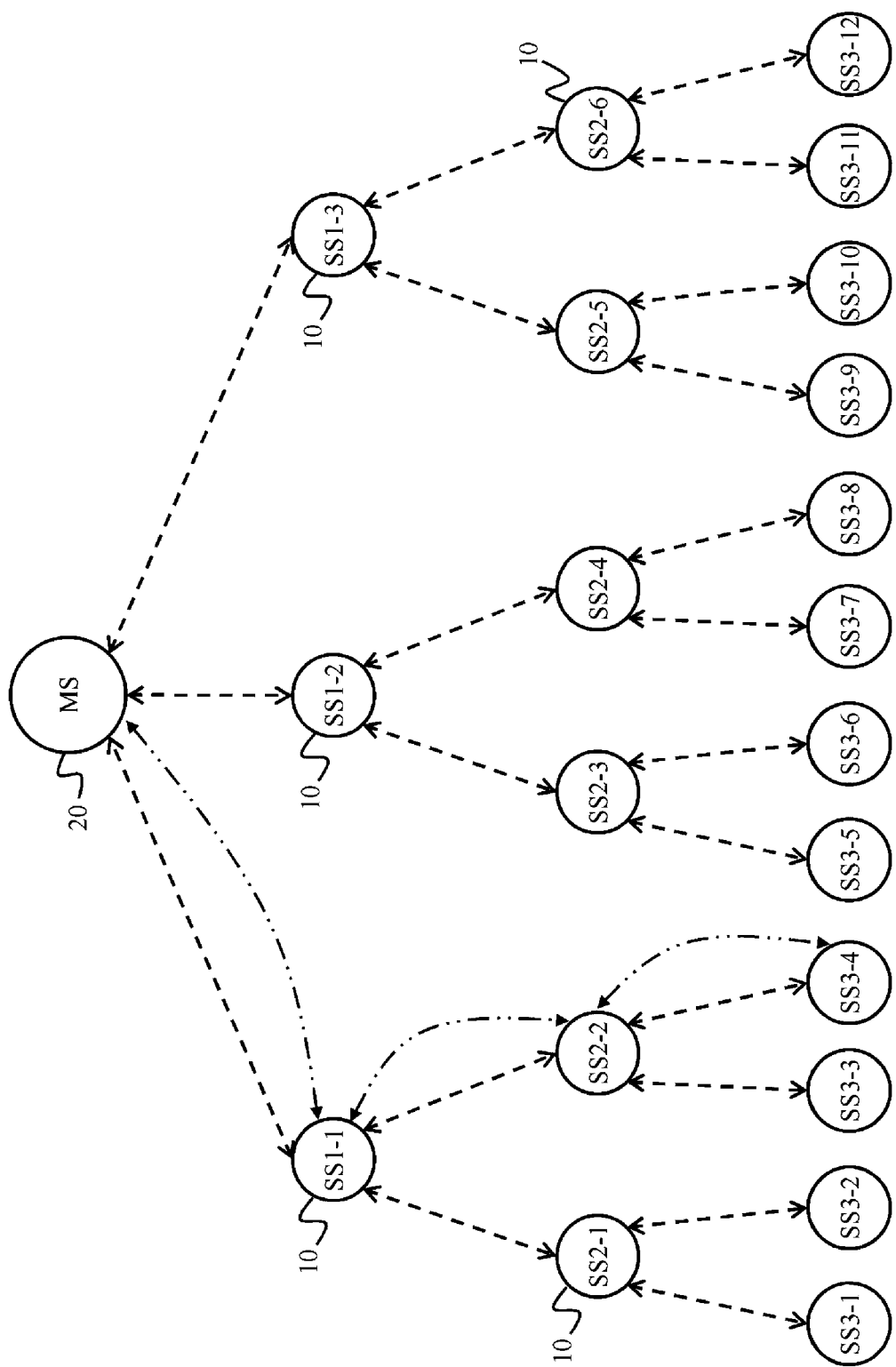
FIG. 2 is an explanatory diagram of a multi-hop wireless network.

FIG. 2 illustrates an overview of the multi-hop wireless network. In this drawing, the wireless master station is displayed as "MS", and the wireless slave station is displayed as "SS". A symbol corresponding to a layer of a communication distance is assigned to the wireless slave station 10. For example, "SS1-1" indicates a first wireless slave station among the wireless slave stations belonging to a layer of which the number of hops is one. The first and second wireless slave stations are administrative orders. Similarly, "SS2-3" indicates a third wireless slave station among the wireless slave stations belonging to a layer of which the number of hops is two.

When the wireless master station 20 communicates with the wireless slave station 10 as the layer of the terminal, the wireless slave station located in the middle functions as a relay station. For example, as represented by a two-dot chain line arrow in FIG. 2, when the wireless master station 20 communicates with the wireless slave station "SS3-4", the wireless slave stations "SS1-1" and "SS2-2" are relay stations. Accordingly, when the wireless master station communicates with the wireless slave station as the terminal, not only the wireless slave station as a communication partner but also the wireless slave stations located in the middle are activated, and power is consumed.

When the measurement data is acquired from the reading device 1 (SS1), the data collection device 2 requests the reading device 1 (SS1) to transmit the data. When the wireless slave station 10 (SS1) of the reading device 1 (SS1) receives a data transmission request from the data collection device 2, the reading device 1 (SS1) is activated.

When the reading device 1 (SS1) is activated, the meter value is read by capturing an image of the inspection target unit 3 by using the camera. The reading device 1 (SS1) determines whether or not the meter value is normally read, generates the measurement data 100, and transmits the measurement data 100 to the data collection device 2. In other embodiments to be described below, when the reading device 1 (SS1) determines that the reading of the meter value has failed due to a raindrop attached to the inspection target unit 3, a failure cause code is added to the measurement data 100.

The wireless slave station 10 (SS1) of the reading device 1 (SS1) transmits the measurement data 100 to the data collection device 2, and then transitions the reading device 1 (SS1) to the sleep state.

Similarly, when the measurement data 100 is acquired from the reading device 1 (SS2), the data collection device 2 requests the reading device 1 (SS2) to transmit the data. This data transmission request reaches the wireless slave station 10 (SS2) via the wireless slave station 10 (SS1) as the relay station.

When the data transmission request is received, the wireless slave station 10 (SS2) activates the reading device (SS2). The reading device 1 (SS2) reads the meter value of the inspection target unit 3, generates the measurement data 100, and sends the generated measurement data from the wireless slave station 10 (SS2) to the data collection device 2. The measurement data 100 of the reading device 1 (SS2) is sent to the data collection device 2 via the wireless slave station 10 (SS1) as the relay station.

FIG. 3 is a configuration example of the sensor management table T1. The sensor is the measurement unit 11. For example, the sensor management table T1 manages a sensor ID C10, a sensor type C11, an inspection target C12, a unit C13, and an installation location C14 in association with each other. The same applies to the description of the following tables, but items other than the illustrated items may be included.

The sensor ID C10 is identification information for uniquely specifying each sensor (measurement unit 11) within the automatic inspection system. The sensor type C11 is information indicating a type of the sensor. Examples of the sensor type include a camera, a level sensor (level meter), a color sensor, a current sensor, and a voltage sensor. The inspection target C12 indicates a measurement target measured by the sensor specified by the sensor ID C10. Examples of the inspection target include a pressure gauge, a thermometer, a liquid level gauge, a color of a desiccant, a signal line for transmitting a current value inside a digital ammeter, a flow meter, and a weight meter. The unit C13 indicates a unit of the measurement of the sensor. For example, the unit of the measurement is Pascal (Pa) for the pressure, Celsius or Fahrenheit for the temperature, Millimeter (mm) for liquid level, and milliampere (mA) for the current. The color sensor may output the measured color as a value of a predetermined color system, or may output an on or off signal indicating whether or not a difference from a designated color exceeds a threshold value. The installation location C14 is information for identifying a location at which the sensor is installed. For example, the installation location of the sensor can be set as information for specifying a control panel corresponding to the sensor or information for specifying a structure such as a tank in which the sensor is installed. The installation location of the sensor may be defined as information for specifying a position within a plant.

FIG. 4 is a configuration example of the determination condition management table T2. The determination condition management table T2 manages the determination condition acquired from the determination condition display unit 4. For example, the determination condition management table T2 includes a determination condition display unit ID (display unit ID in this drawing) C20, an installation location C21, an acquisition date C22, and a determination condition C23.

The display unit ID C20 is identification information for uniquely specifying the determination condition display unit 4 that displays the determination condition within the automatic inspection system. The installation location C21 is information indicating the installation location of the determination condition display unit 4. For example, the installation location can be set as information for specifying a control panel on which the determination condition display unit 4 is provided and information for specifying a structure at which the determination condition display unit 4 is installed. The user can quickly ascertain a correspondence between the sensor (measurement unit 11) and the determination condition display unit 4 by similarly defining the installation location C14 of the sensor described in FIG. 3 and the installation location C21 of the determination condition display unit 4 illustrated in FIG. 4. The acquisition date C22 is information on a date and time when the determination condition is acquired from the determination condition display unit 4. The determination condition C23 is a determination condition obtained by analyzing the information acquired from the determination condition display unit 4. For example, the data collection device 2 can obtain the determination condition by analyzing the image data including a graph and a threshold value displayed on the determination condition display unit 4. The determination condition (for example, the range of the normal state) obtained by the analysis is managed in the item C23.

FIG. 5 is a configuration example of the table T3 that manages a method of displaying the determination result of the inspection. For example, the inspection determination result display table T3 manages a determination condition display unit ID (display unit ID in this drawing) C30, a vertical axis sensor ID C31, and a horizontal axis sensor ID C32.

The display unit ID C30 is identification information for uniquely specifying the determination condition display unit 4 that displays the determination condition within the automatic inspection system. The vertical axis sensor ID C31 is information for specifying a sensor (measurement unit 11) corresponding to a vertical axis of a two-dimensional graph. Similarly, the horizontal axis sensor ID C32 is information for specifying a sensor corresponding to a horizontal axis of the two-dimensional graph. When a value is not set for the vertical axis sensor ID C31, the determination condition is displayed only on the horizontal axis based on one sensor.

When a value is not set for the horizontal axis sensor ID C32, the determination condition is displayed only on the vertical axis based on one sensor. A shape of the graph is not particularly limited. Any of a pie chart, a straight line graph, and a curved line graph may be used. The inspection result is not limited to display in one or two dimensions, but may be displayed in three or more dimensions.

Figure 6:
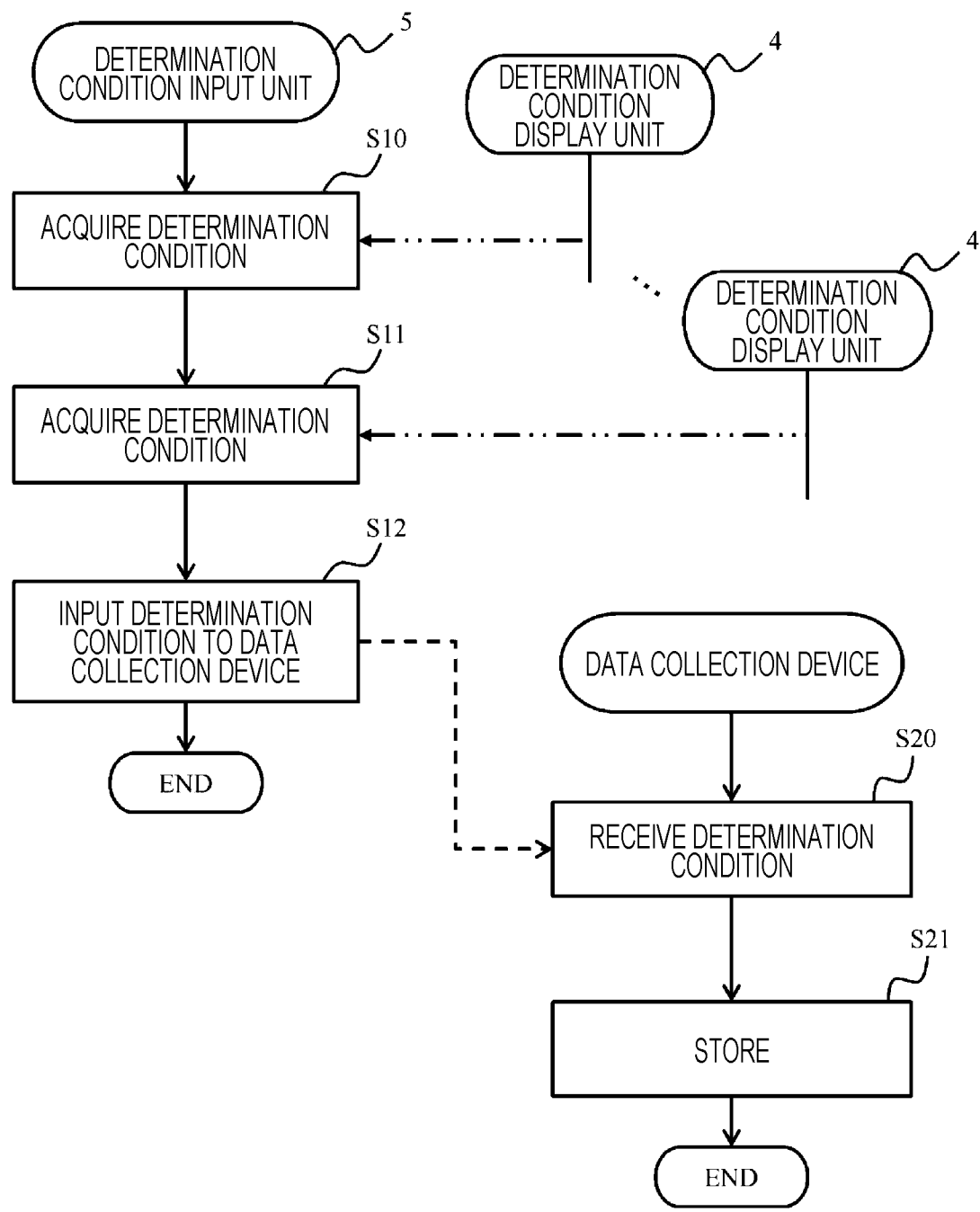
FIG. 6 is a flowchart illustrating a scene in which a determination condition displayed on the determination condition display unit is acquired and registered in a data collection device.

FIG. 6 is a flowchart illustrating a process of acquiring the determination condition from the determination condition display unit 4 and storing the acquired determination condition in the data collection device 2.

For example, the user circulates within the plant with the determination condition input unit 5, and acquires the determination condition from each determination condition display unit 4 (S10,S11). The user inputs the determination condition (for example, image data obtained by capturing an image of the determination condition) acquired from each determination condition display unit 4 to the data collection device 2 (S12) by connecting the determination condition input unit 5 to the data collection device 2.

When the determination condition is received from the determination condition input unit 5 via the data acquisition unit 21 (S20), the data collection device 2 analyzes the received determination condition, and stores the determination condition which is the analysis result in the determination condition storage unit 26 (S21).

Figure 7:
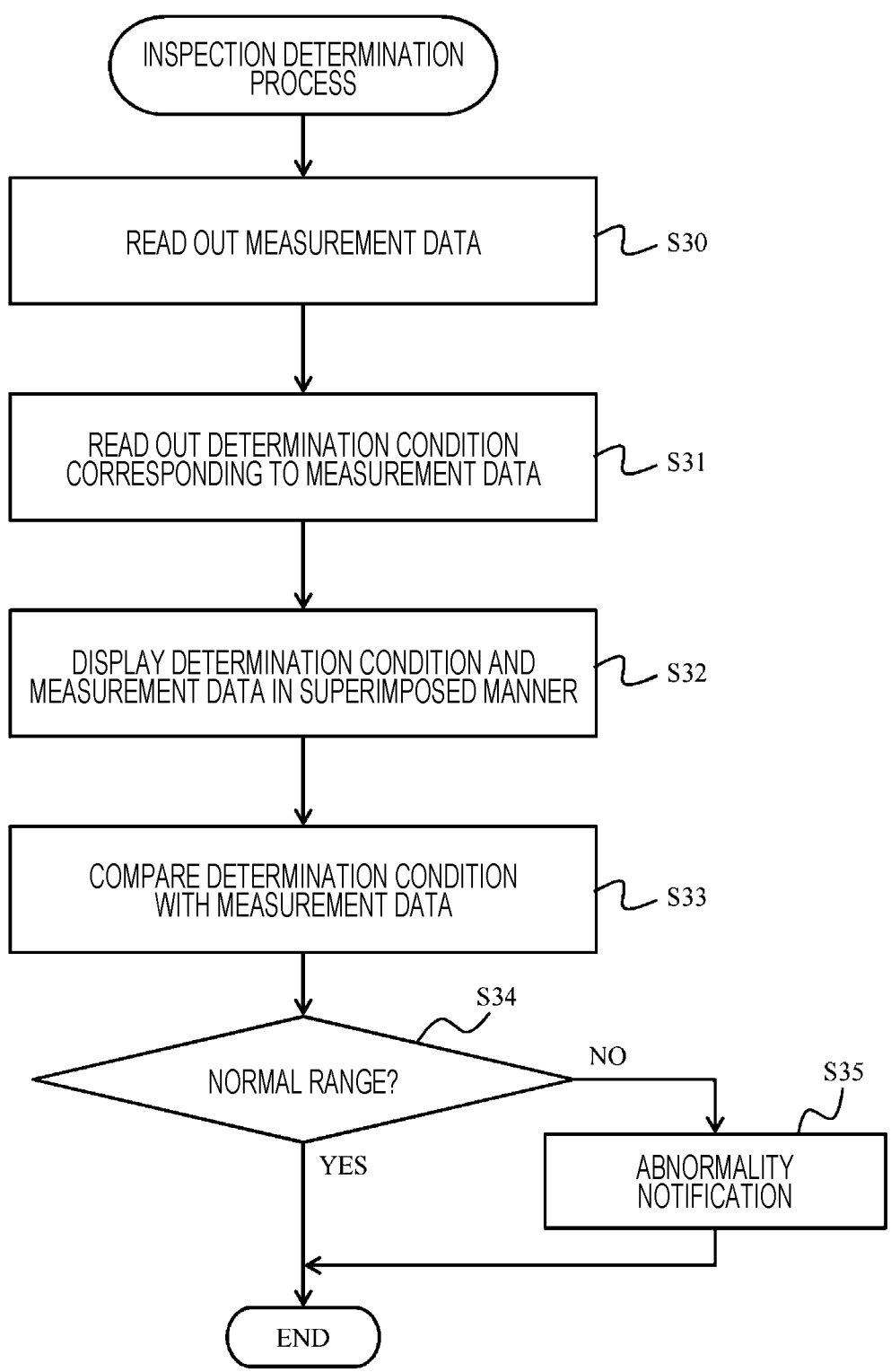
FIG. 7 is a flowchart of an inspection determination process.

FIG. 7 is a flowchart of an inspection determination process. When a display request from the user is input from the UI unit 23, the inspection recording unit 22 reads out the measurement data corresponding to the display request from the measurement data storage unit 25 (S30), and reads out the determination condition corresponding to the measurement data from the determination condition storage unit 26 (S31).

The inspection recording unit 22 superimposes the measurement data read out in steps S30 and S31 and the determination condition on each other, and causes the UI unit 23 to display the superimposed measurement data and determination condition (S32). Display examples will be described below with reference to FIGS. 8 and 9.

The inspection recording unit 22 compares the measurement condition the determination condition displayed in the superimposed manner (S33), and determines whether or not the measurement data falls within the normal range indicated by the determination condition (S34). When it is determined that the measurement data does not fall within the normal range (S34: NO), the inspection recording unit 22 notifies that an abnormal state is detected through the UI unit 23 (S35), and ends the present process. Meanwhile, when it is determined that the measurement data falls within the normal range (S34: YES), the inspection recording unit 22 ends the present process without performing any particular process. When it is determined that the measurement data falls within the normal range, the inspection recording unit 22 may notify that the normal state is detected through the UI unit 23.

Figure 8:
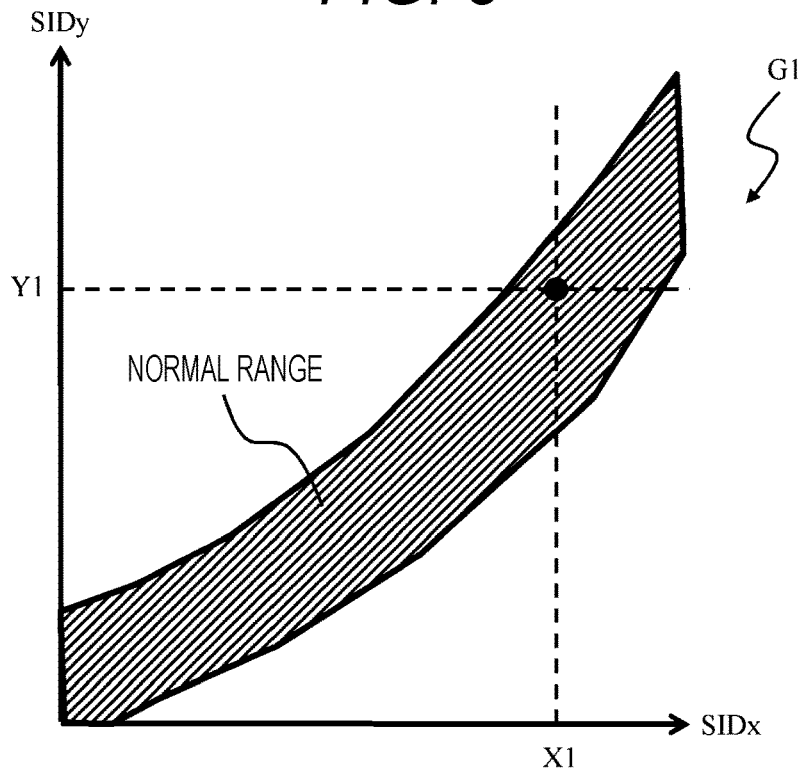
FIG. 8 is an example of a display screen of the inspection determination result.

FIG. 8 is an example of a display screen G1 by the UI unit 23. FIG. 8 illustrates a scene in which a combination of the pieces of measurement data falls within the normal range.

A graph illustrated on the screen G1 in FIG. 8 illustrates the determination conditions when the vertical axis sensor ID is "SIDy" and the horizontal axis sensor ID is "SIDx". The normal range is indicated by hatching. When the measurement data of the sensor corresponding to the vertical axis is "Y1" and the measurement data of the sensor corresponding to the horizontal axis is "X1", an intersection of these measurement data is located in the normal range. Accordingly, the example of FIG. 8 indicates that the normal state is detected.

Figure 9:
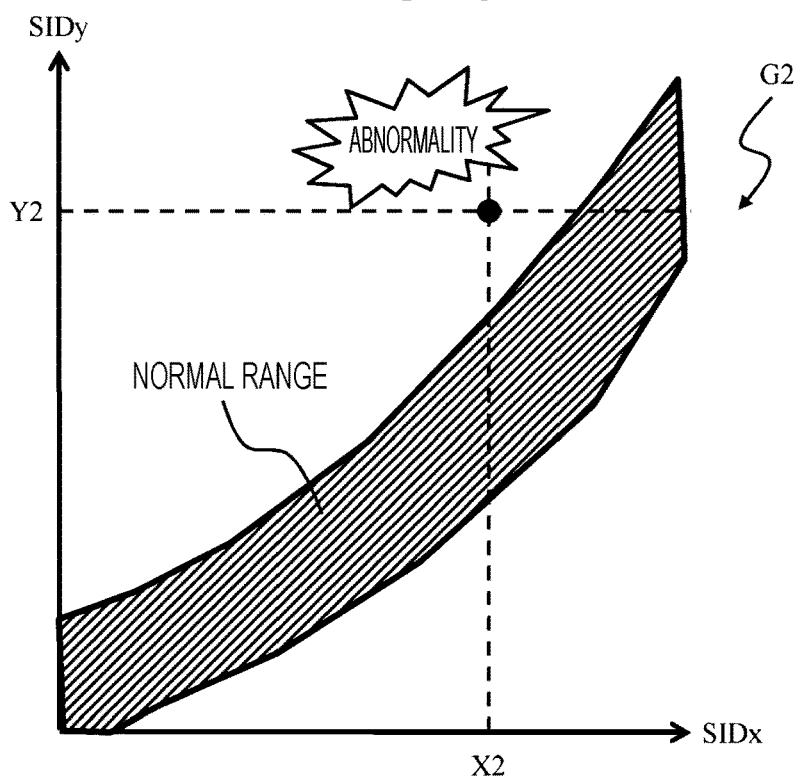
FIG. 9 is another example of the display screen.

FIG. 9 is an example of another display screen G2. FIG. 9 illustrates a scene at which the combination of the pieces of measurement data does not fall within the normal range.

When the measurement data of the sensor corresponding to the vertical axis is "Y2" and the measurement data of the sensor corresponding to the horizontal axis is "X2", an intersection of these measurement data does not fall within the normal range. Accordingly, the example of FIG. 9 illustrates that the abnormal state is detected. Therefore, the inspection recording unit 22 displays an abnormal state on the screen, and alerts the user.

According to the present embodiment having the above-described configuration, the inspection recording unit 22 can output the predetermined measurement data selected from the pieces of measurement data stored in the measurement data storage unit 25 and the predetermined determination condition corresponding to the predetermined measurement data among the determination conditions stored in the determination condition storage unit 26 in association with each other, and can display the associated measurement data and determination condition on the screen through the UI unit 23. Therefore, according to the present embodiment, the user does not need to search for and collate the determination conditions one by one at the time of confirming the measurement data, and it is possible to improve efficiency of an inspection operation.

In the present embodiment, in addition to displaying the measurement data and the determination condition in the superimposed manner, it is possible to determine whether or not the inspection target is in the normal state by comparing the measurement data and the determination condition, and it is possible to display the determination result on the same screen. Thus, the user can immediately ascertain whether or not the inspection target is in the normal state, and thus, usability is improved.

In the present embodiment, it is possible to acquire the determination condition from the determination condition display unit 4 installed at the site by using the determination condition input unit 5, and it is possible to register the acquired determination condition in the data collection device 2. Accordingly, it is possible to introduce the automatic inspection system to a plant in which the inspection target unit 3 and the determination condition display unit 4 are scattered by so-called post installation. That is, it is possible to realize automatic inspection of the plant by attaching the reading device 1 to the inspection target unit 3 by the post installation, acquiring the determination condition by the determination condition input unit 5, and registering the acquired determination condition in the data collection device 2.

Second Embodiment

Figure 10:
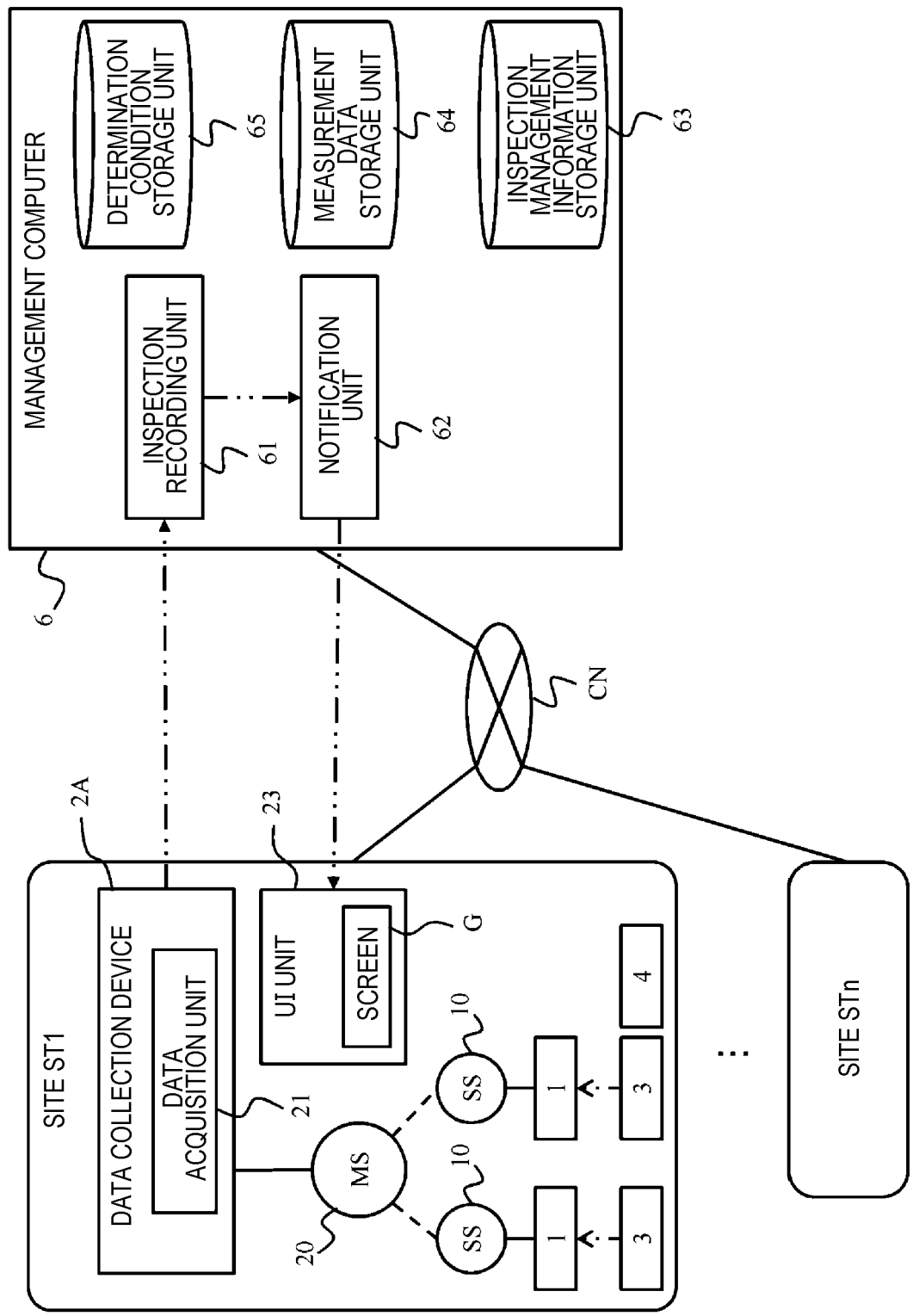
FIG. 10 is an overall view of an automatic inspection system according to a second embodiment.

A second embodiment will be described with reference to FIG. 10. In the following embodiments including the present embodiment, differences from the first embodiment will be mainly described. In the present embodiment, a management computer 6 is in charge of automatic inspection for a plurality of monitoring target sites ST1 to STn.

For example, the monitoring target sites ST1 to STn are set for each monitoring target site such as a plant or a substation. Unless particularly distinguished, the monitoring target sites ST1 to STn are referred to as a monitoring target site ST.

Each monitoring target site ST includes a plurality of reading devices 1, one data collection device 2A, a plurality of inspection target units 3, and a plurality of determination condition display units 4. The data collection device 2A includes only the data acquisition unit 21. The inspection recording unit and the storage unit are provided in the management computer 6. In the site ST, the UI unit 23 can be provided as a device separate from the data collection device 2A. The data collection device 2A and the UI unit 23 may be integrated.

The management computer 6 is connected to the plurality of monitoring target sites ST via a communication network CN. The management computer 6 automatically inspects each site ST in a remote manner, and displays the inspection determination result on the UI unit 23 in each site ST.

The management computer 6 includes, for example, an inspection recording unit 61, a notification unit 62, an inspection management information storage unit 63, a measurement data storage unit 64, and a determination condition storage unit 65.

Similarly to the inspection recording unit 22 of the first embodiment, the inspection recording unit 61 stores the measurement data received from each reading device 1, and outputs the measurement data and the determination conditions in association with each other. The notification unit 62 transmits and displays information (display data obtained by superimposing the measurement data and the determination condition, the determination result) input from the inspection recording unit 61 to the UI unit 23.

The inspection management information storage unit 63 stores information necessary for the automatic inspection for each site ST. The measurement data storage unit 64 stores the measurement data 100 collected from each reading device 1 via the multi-hop wireless network for each site ST at each site ST. The determination condition storage unit 65 stores the determination condition collected at each site ST for each site ST.

The present embodiment having the above-described configuration also achieves the same effects as the first embodiment. In the present embodiment, since one management computer 6 is in charge of the automatic inspection at the plurality of monitoring target sites ST and notifies the inspection result to each site ST, it is possible to efficiently use the computer resources required for determining the automatic inspection. Since the management computer 6 is in charge of the automatic inspection at the plurality of sites ST, it is possible to use, as input data for machine learning, the measurement data collected from each site ST.

Third Embodiment

A third embodiment will be described with reference to FIGS. 11 and 12. In the present embodiment, a data collection device 2B in the site ST can request an external computer 6B to perform determination such as abnormality sign diagnosis.

Figure 11:
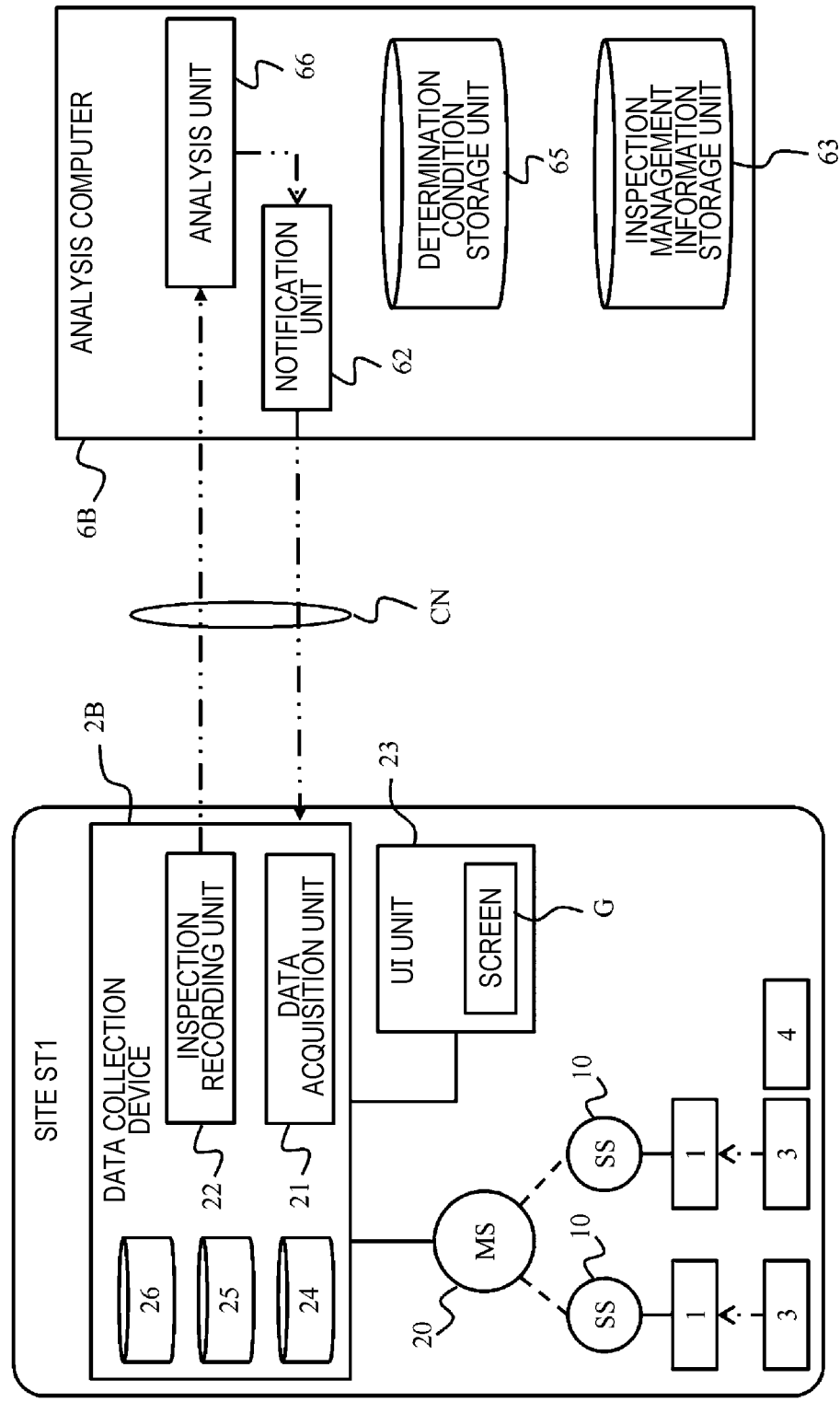
FIG. 11 is an overall view of an automatic inspection system according to a third embodiment.

As illustrated in the overall configuration diagram of FIG. 11, the analysis computer 6B is connected to the data collection device 2B in the site ST via the communication network CN. The analysis computer 6B includes, for example, a determination unit 66, a notification unit 62, a determination condition storage unit 65, and an inspection management information storage unit 63. FIG. 11 illustrates a case where the analysis computer 6B is connected to the data collection device 2B in one site ST, but the analysis computer 6B can be actually connected to the data collection devices in the plurality of sites ST.

The determination unit 66 performs a predetermined determination process in response to a request from the inspection recording unit 22 of the data collection device 2B, and transmits the result from the notification unit 62 to the data collection device 2B via the communication network CN.

When information is received from the analysis computer 6B, the data collection device 2B of the monitoring target site ST displays the received information on the screen G of the UI unit 23.

Figure 12:
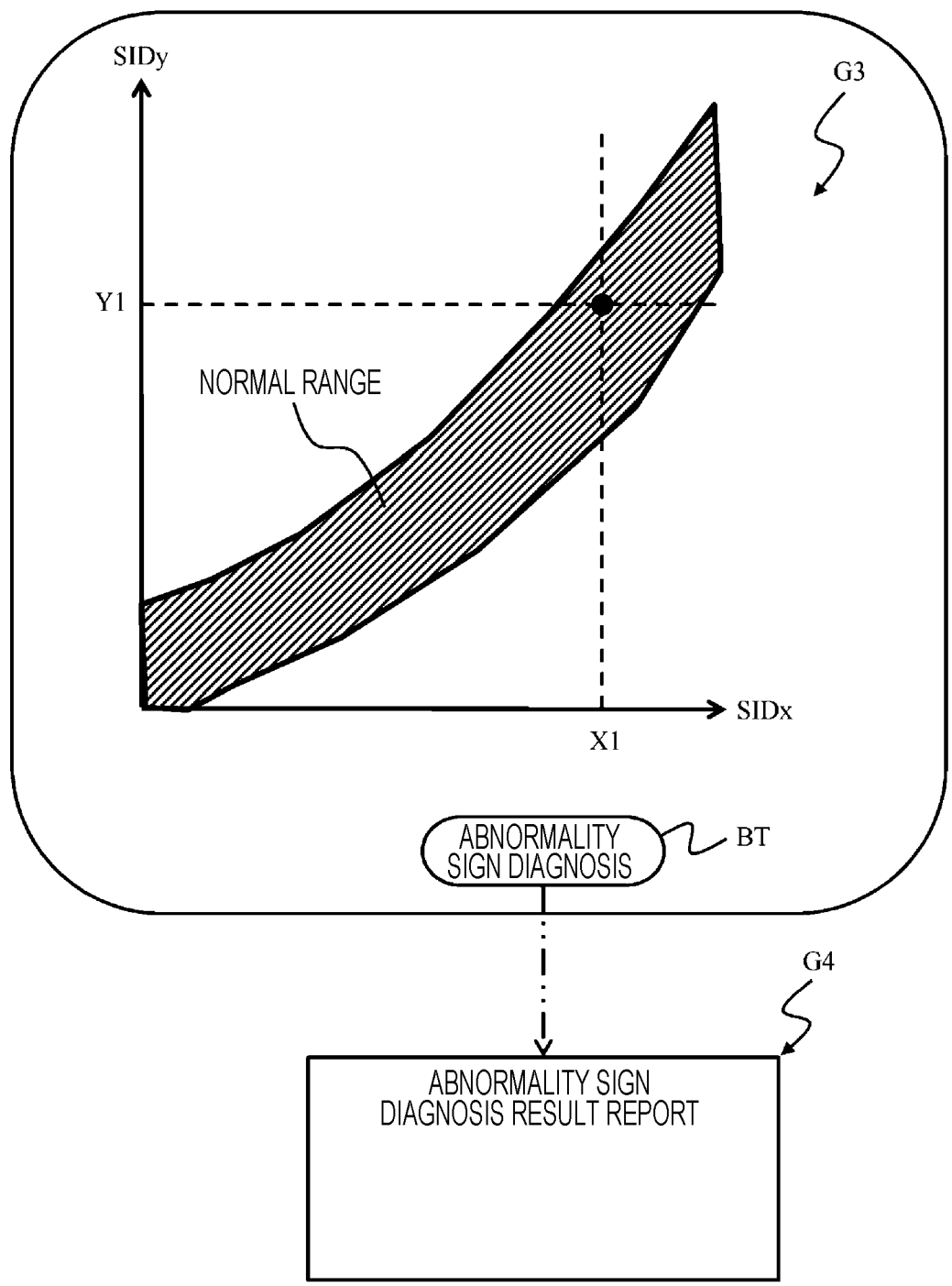
FIG. 12 is an example of a display screen including a button for requesting abnormality sign diagnosis.

FIG. 12 illustrates an example of the screen displayed on the UI unit 23. As illustrated in an upper side of FIG. 12, it is possible to display whether or not the state of the inspection target unit 3 is the normal state on a screen G3 by displaying the measurement data and the determination condition in the superimposed manner. The screen G3 includes a button BT for requesting the analysis computer 6B to perform a predetermined determination process. In the present embodiment, abnormality sign diagnosis indicating a possibility that the inspection target is in the abnormal state is described as an example.

When the screen G3 indicates that the inspection target is in the normal state, the user can determine whether or not there is a sign of abnormality for the analysis computer 6B by operating an abnormality sign diagnosis button BT.

When the user pushes the predictive diagnosis button BT, data necessary for the abnormality sign diagnosis is transmitted from the data collection device 2B to the analysis computer 6B. The analysis computer 6B determines a possibility that the abnormal state occurs based on the data received from the data collection device 2B, and returns the determination result to the data collection device 2B. The data collection device 2B displays, as a screen G4, a determination result (in this case, an abnormality sign diagnosis result report) received from the analysis computer 6B on the UI unit 23.

The present embodiment having the above-described configuration also achieves the same effects as the first embodiment. In the present embodiment, even though it is determined that the inspection recording unit 22 in the site is in the normal state, when the user desires, since the abnormality sign diagnosis as a predetermined determination process is required for the external analysis computer 6B, the usability is further improved. In the present embodiment, since one analysis computer 6B can be charge of the data collection devices 2B in the plurality of sites ST, it is possible to efficiently perform the predetermined determination process.

Fourth Embodiment

A fourth embodiment will be described with reference to FIGS. 13 to 17. In the present embodiment, the measurement is retried stepwise according to a cause when the measurement fails due to the surrounding environment in the automatic inspection system using the multi-hop sensor wireless network.

When the wireless master station 20 communicates with the wireless slave station 10 of the terminal by using the multi-hop wireless network, a communication operation in which the plurality of slave stations 10 is hopped (is transferred by the reception and transmission in a unit of the packet) is performed. Accordingly, in order to suppress the power consumption of the wireless slave station 10, it is preferable that the frequency of communication with the terminal slave station 10 of which the number of hops is large is low.

Meanwhile, when the state (for example, meter value) of the inspection target unit 3 is read by using the measurement unit 11, a situation in which an appropriate image cannot be captured due to the surrounding environment such as condensation or rain may occur. In this case, it is necessary to read the meter value again and transfer the read meter value to the wireless master station 20, but each wireless slave station 10 involved in this retry consumes power for transferring the data.

For example, when the reading of the meter value fails at the terminal wireless slave station 10 of which the number of hops is large and the wireless master station 20 immediately instructs the wireless slave station 10 of the terminal to retry, the reciprocating of the multi-hop communication including another wireless slave station 10 operated as the relay station newly occurs. Thus, power consumption increases in the entire multi-hop wireless network. However, since there is no guarantee that the retry will be successful, there is a concern that a battery of each wireless slave station 10 is wasted.

For example, when it is difficult to read the meter value due to condensation, since there is a low possibility that the state thereof is immediately resolved, even though the retry is immediately performed for the condensed meter, useless multi-hop communication is merely performed, and thus, the battery of the wireless slave station 10 as the relay station is also wasted.

Incidentally, the wireless slave station 10 is typically in a power-saving sleep state, and is activated only when the data is transferred or when the meter value is read. Accordingly, when a useless retry is performed, a time during which the wireless slave station 10 is in the sleep state is shortened, and the power consumption is increased.

Thus, in the present embodiment, under an environmental condition in which it is difficult to read the state of the inspection target unit 3, a power-saving and highly reliable automatic inspection system is achieved by performing retries stepwise according to a failure cause of the measurement.

Figure 13:
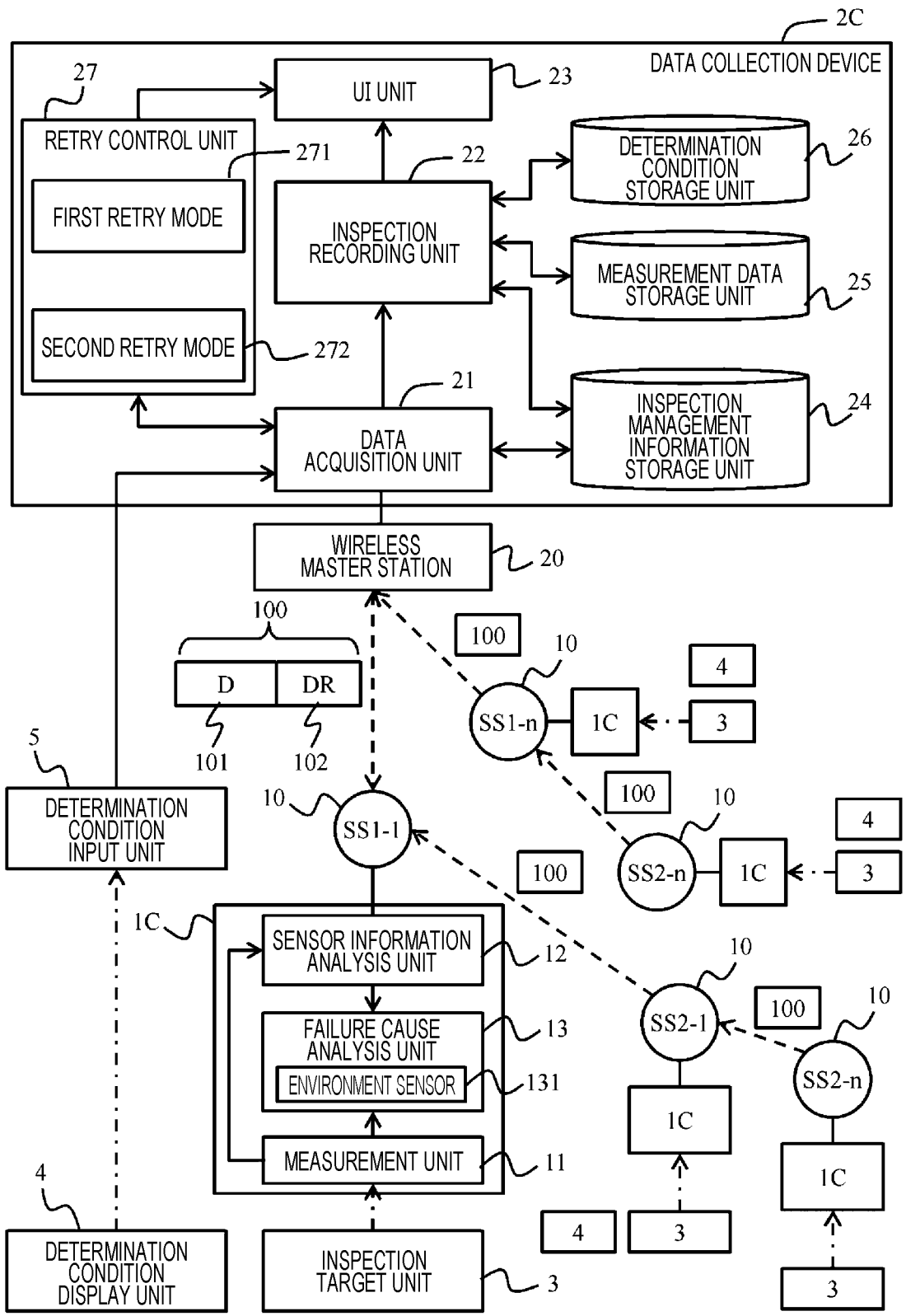
FIG. 13 is an overall view of an automatic inspection system according to a fourth embodiment.

FIG. 13 is an overall view of the automatic inspection system according to the present embodiment. A reading device 1C includes a failure cause analysis unit 13 in addition to the measurement unit 11 and the sensor information analysis unit 12.

When the sensor information analysis unit 12 fails to analyze the state of the inspection target unit 3 (when the reading of the meter value fails), the failure cause analysis unit 13 analyzes the cause of the failure. For example, the failure cause analysis unit 13 can estimate the cause of the failure in the reading of the meter value based on a comparison result of the image data for which the reading of the meter value fails with a known failure pattern and surrounding environment information detected by an environment sensor 131.

Examples of the environment sensor 131 include a temperature sensor, a humidity sensor, an atmospheric pressure sensor, an illuminance sensor, and an object detection sensor. The environment sensor 131 can include at least one of these sensors. Alternatively, at least one sensor included in the environment sensor 131 may be shared with the measurement unit 11. For example, a camera and an infrared object detection sensor may be combined, or a camera and an illuminance sensor may be combined.

The measurement data 100 of the present embodiment includes a read state (for example, meter value) 101 of the inspection target unit 3 and success and failure information 102. The success and failure information 102 is information indicating whether or not the reading of the state of the inspection target unit 3 succeeds, and includes a code for specifying the failure cause when the reading fails. The failure cause code for specifying the failure cause corresponds to "failure cause information".

The failure causes can be broadly classified into a failure cause that is likely to be resolved over time and a failure cause that is less likely to be resolved over time by the failure cause analysis unit 13. Details thereof will be described below with reference to FIG. 14.

FIG. 14 illustrates an example of a retry control table 270. The retry control table 270 is used by a retry control unit 27 of the data collection device 2.

For example, the retry control table 270 manages items such as a failure cause 2701, an influence range 2702, an influence period 2703, and a coping method 2704. The retry control table may further include items other than the illustrated items.

The failure cause 2701 is an item indicating the cause of the failure in the reading of the state of the inspection target unit 3 using the reading device 1C. The failure cause 2701 is associated with a value of the failure cause code 102. Examples of the failure cause includes a cause due to a water drop such as rain or condensation, a cause due to light or shadow, or a cause due to attachment of a foreign matter.

The influence range 2702 indicates a range (a range of the reading device 1C that monitors the meter) of the inspection target unit 3 that is influenced by the failure cause indicated by the failure cause 2701. For example, as the influence range 2702, there are a case where the plurality of inspection target units 3 is influenced (a case where the influence is in a wide range) and a case where one or several inspection target units 3 are influenced (a case where the influence is limited).

The influence period 2703 indicates a temporal range in which the failure cause indicated by the failure cause 2701 influences the measurement. As the influence period 2703, there are the case of several hours to several days (in the case of a long time), the case of several hours (in the case of a short time), and a case where the influence is continued until the cause is removed.

The coping method 2704 illustrates a coping method for the failure cause. Examples of the retry method include a stepwise retry and an alarm output. The stepwise retry is a method performed such that the retry is performed for the reading device 1C belonging to a layer of which the number of hops is small and when the retry succeeds, the retry is performed for the reading device 1C belonging to a layer of which the number of hops is the second smallest or the reading devices 1C belonging to all other layers.

Figure 15:
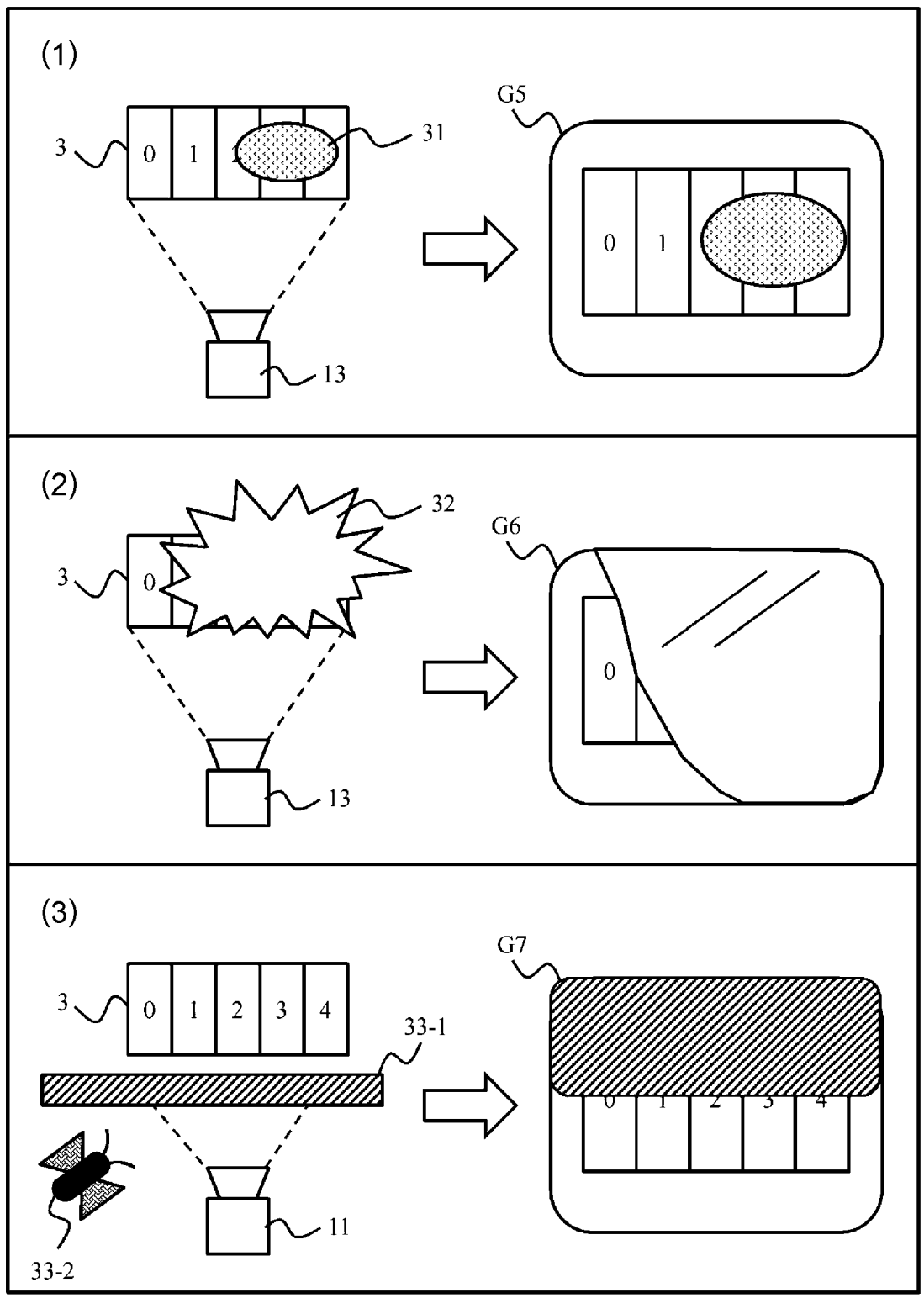
FIG. 15 is an explanatory diagram illustrating a case where failure causes of the measurement are classified.

FIG. 15 illustrates an example of a reading result of the state of the inspection target unit 3 for each failure cause. As illustrated in FIG. 15(1), when the cause is a water droplet 31 such as rain or condensation among the failure causes 2701, the readability of at least a part of the meter value is reduced due to the water drop (G5). However, the failure cause depends on a weather condition, but there is a high possibility that the water droplet 31 disappears over time. For example, the condensation disappears when the temperature rises, and raindrops eventually evaporate when it is sunny. However, in a rainy season such as rainy days, there is a possibility that a reading failure of the state of the inspection target unit 3 due to the water droplets is continued for several days. Thus, the stepwise retry and the alarm output are set as the coping method 2704 in this case. When it is determined that it takes a time longer than a predetermined value until the water droplet disappears, an alarm may be output, and when it is determined that the water droplet disappears in a time less than the predetermined value, the stepwise retry may be performed.

For example, as illustrated in FIG. 15(2), a case where the light or the shadow is the cause among the failure causes 2701 is a case where the read image is degraded since light 32 reflected from an object such as a vehicle is incident on the inspection target unit 3 or the read image is degraded since the shadow of the object such as the vehicle covers the inspection target unit 3 (G6). There is a high possibility that the cause due to the light or the shadow is resolved in a relatively short time. Meanwhile, when a tree near the inspection target unit 3 falls and the inspection target unit 3 is under the shadow of the tree, it may take a time until the cause is removed. Thus, the stepwise retry and the alarm output are set as the coping method 2704 in this case.

As illustrated in FIG. 15(3), among the failure causes 2701, a case where the attachment of the foreign matter is the cause is a case where a foreign matter 33 such as insects, dust, and fallen leaves is attached to the inspection target unit 3 or the measurement unit 11. In FIG. 15(3), a stationary foreign matter 33-1 such as a tree branch or dust and a movable foreign matter 33-2 such as a living insect are separately illustrated.

In this case, at least a part of the image obtained by capturing an image of the meter value is covered with the foreign matter 33, and the meter value cannot be accurately read (G7). When the foreign matter 33 is the cause, there is a high possibility that the meter value cannot be normally read until the user removes the foreign matter 33. Therefore, the alarm output is set as the coping method 2704 in this case.

The failure cause and the coping method are not limited to the above-described example. That is, in the present embodiment, the retry method of the data acquisition is controlled according to the classification result of the failure cause.

Figure 16:
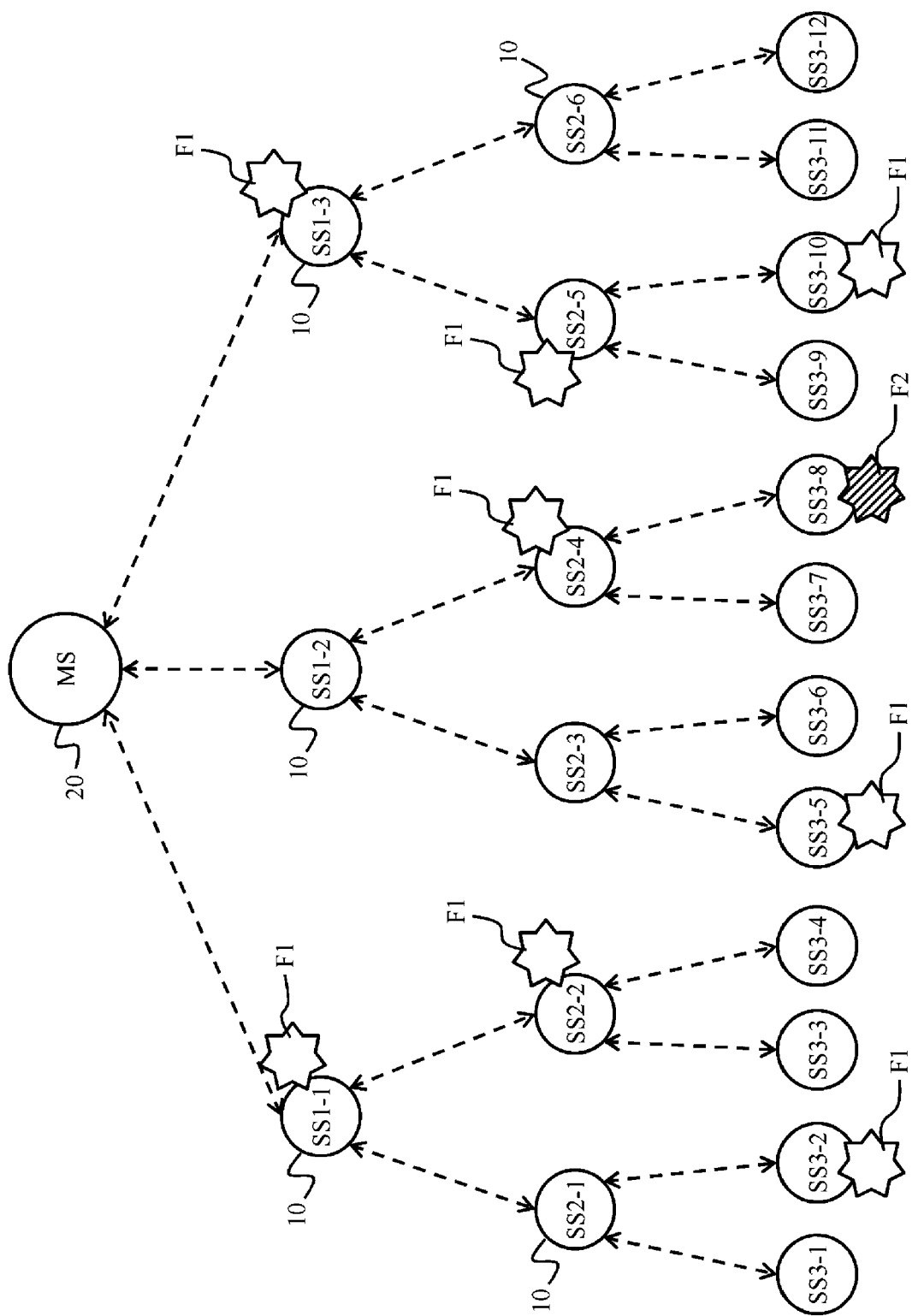
FIG. 16 is an explanatory diagram illustrating a scene in which data acquisition is retried.

FIG. 16 is a schematic diagram illustrating a scene of the stepwise retry. As in FIG. 2, in this drawing, the wireless slave station 10 of the reading device 1C is displayed instead of the reading device 1C, and the wireless master station 20 is displayed instead of the data collection device 2.

The multi-hop wireless network illustrated in FIG. 16 includes three layers: a layer of which hop number=1, a layer of which hop number=2, and a layer of which hop number=3. Among the reading devices 1C constituting this multi-hop wireless network, some reading devices 1C fail to read the state of the inspection target unit 3. A mark F1 or F2 indicating the failure cause is displayed on the reading device 1C that fails to read the state. Here, time-based resolving type causes in which the cause is resolved over time are assigned reference numeral F1, and the other causes are assigned reference numeral F2. Hereinafter, the reading device 1C that fails to read the state of the inspection target unit 3 may be abbreviated as a reading failure device 1.

The retry control unit 27 of the data collection device 2 retries to acquire the data for the reading failure devices 1C (SS1-1) and 1C (SS1-3) present in the closest layer. For example, when the retry is performed for a plurality of reading failure devices 1C in the same layer, a round robin method can be adopted.

When the retry succeeds for all the reading failure devices 1C in the first layer, the data collection device 2 retries to acquire the data for the reading failure devices 1C (SS2-2), 1C (SS2-4), and 1C (SS2-5) in the second layer. In this case, the retry can be performed in order by using the round robin method.

When the retry succeeds for all the reading failure devices 1C in the second layer, the data collection device 2C retires to acquire the data for the reading failure devices 1C (SS3-2), 1C (SS3-5), and 1C (SS3-10) in the third layer. In this case, the round robin method can be used. The reading failure device 1C (SS3-8) in which the cause F2 other than the time-based resolving type failure cause occurs is not a retry target. This is because even though the retry is performed, the power is merely consumed.

As described above, the data collection device 2C can retry to acquire the data for the reading failure device 1C in units of the layers based on the number of hops. Instead, when the retry in the closest first layer succeeds, the data collection device 2C may retry all the reading failure devices 1C in all the other layers at once. That is, when the data acquisition succeeds in the reading failure devices 1C (SS1-1) and 1C (SS1-3), the failure cause F1 is deemed to be also resolved in the other reading failure devices 1C, and the retry for the other reading devices 1C (SS2-2), 1C (SS2-4), 1C (SS2-5), 1C (SS3-2), 1C (SS3-5), and 1C (SS3-10) may be almost simultaneously performed.

Figure 17:
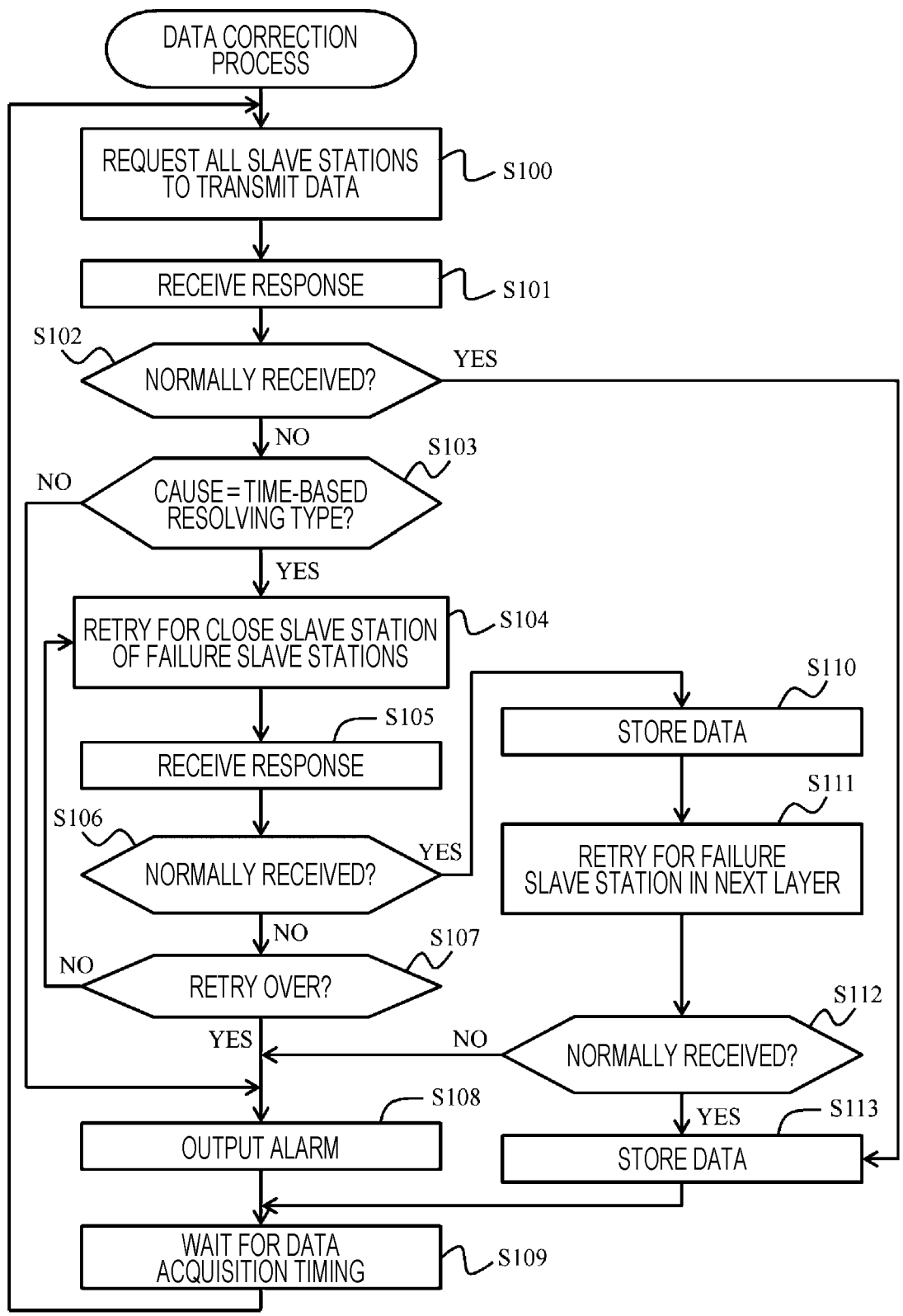
FIG. 17 is a flowchart of a data collection process.

FIG. 17 is a flowchart illustrating a data collection process. The data acquisition unit 21 of the data collection device 2C requests all the wireless slave stations 10 to transmit the data (S100). When the data transmission request is received, each wireless slave station 10 activates the reading device 1C, and causes the measurement unit 11 to read the meter value. The wireless slave station 10 transmits the measurement data 100 generated by the reading device 1C to the data collection device 2C.

The data acquisition unit 21 receives the measurement data 100 from each wireless slave station 10 via the multi-hop wireless network (S101). The data acquisition unit 21 determines whether or not all the received measurement data 100 is normal (S102). When it is determined that all the measurement data 100 is normal (S102: YES), the data acquisition unit 21 transmits and stores the measurement data 100 to and in the inspection recording unit 22 (S113).

When the data acquisition unit 21 determines that some of the pieces of measurement data 100 received in step S101 fail (S102: NO), the retry control unit 27 analyzes the failure cause code 102 included in the failed measurement data 100, and determines whether or not the failure cause code the time-based resolving type failure cause (S103). For example, as described with reference to FIG. 14, the time-based resolving type failure cause includes a case where the water droplet such as rain or condensation is the cause and a case where the light or the shadow is the cause.

When it is determined that the failure cause code is the time-based resolving type failure cause (S103: YES), the retry control unit 27 retries to acquire the data for the reading failure device 1C belonging to the closest layer in the round robin method (S104).

When the measurement data 100 is received from the reading failure device 1C (S105), the data acquisition unit 21 determines whether or not the measurement data 100 is normal (S106). When the measurement data 100 obtained by the retry is not normal and includes the failure cause code 102 (S106: NO), the retry control unit 27 determines whether or not the retry is performed by a predetermined number of times of the retry (S107). When the retry is not performed by the predetermined number of times of the retry set in advance (S107: NO), the process returns to step S104 after waiting for a predetermined time, and the retry to acquire the data is performed for the reading failure device 1C in the closest layer again.

Meanwhile, when the measurement data 100 received as a result of the retry for the reading failure device 1 of the closest layer is normal (S106: YES), the data acquisition unit 21 sends and stores the measurement data 100 to and in the inspection recording unit 22 (S110).

The retry control unit 27 retries to acquire the data for the reading failure device 1C belonging to the next closest layer (S111). When it is determined that the measurement data 100 obtained by the retry is normal (S112: YES), the data acquisition unit 21 transmits and stores the measurement data 100 to and in the inspection recording unit 22 (S113). Hereinafter, a case where the retry is performed stepwise for two layers will be described.

When the retry for the reading failure device 1C in the closest layer reaches the predetermined number of times of the retry (S107: YES) or the retry for the reading failure device 1C in the next closest layer fails (S112: NO), the retry control unit 27 outputs the alarm from the UI unit 23 (S108). The user who receives this alarm arranges an operation for maintenance of the reading failure device 1C.

When the acquisition of the meter value is completed in this manner, the data acquisition unit 21 waits for the next data acquisition timing (S109). Even when the measurement data 100 obtained as the result of the retry for the reading failure device 1C of the next closest layer is normal and is stored in the measurement data storage unit 25 by the inspection recording unit 22, the data acquisition unit 21 waits for the next data acquisition timing. The data collection device 2C collects and stores the measurement data from each reading device 1C at a frequency of several times to several tens of times a day.

In FIG. 17, a case where the reading devices 1C are divided into two layers according to the distance (number of hops) from the wireless master station 20, but the reading devices 1C belonging to the multi-hop wireless network can also be divided into three or more layers.

The data collection device 2 can perform the retry for the reading failure devices 1C of each layer in descending order by the number of hops. Alternatively, the retry for the reading failure devices 1C in the closest layer is positioned as a retry for investigation to investigate whether or not the failure cause is resolved, and when the retry for investigation succeeds, the retry may be performed for all the remaining reading failure devices 1C.

The present embodiment having the above-described configuration also achieves the same effects as the first embodiment. In the present embodiment, it is possible to perform the retry by a method according to the failure cause in the automatic inspection system using the multi-hop wireless network. As a result, in the present embodiment, it is possible to acquire the data from the reading device 1C while the power consumption is suppressed as much as possible, and it is possible to achieve both power saving and high reliability. The present embodiment can be combined with any of the above-described second and third embodiments.

The present invention is not limited to the above-described embodiments. A person skilled in the art can variously add and change within the scope of the present invention. In the above-described embodiments, the present invention is not limited to the configuration examples illustrated in the accompanying drawings. The configurations and processing methods of the embodiments can be appropriately changed within the scope of achieving the object of the present invention.

The components of the present invention can be arbitrarily selected, and an invention having a selected configuration is also included in the present invention. The configurations described in the claims can be combined into combinations other than those specified in the claims.

The present embodiments also include the following features.

"When the data acquisition from the predetermined inspection target reading device belonging to a layer of which the number of hops is one succeeds, the retry control unit retries to acquire the data from the predetermined inspection target reading device belonging to another layer of which the number of hops is large".

"When the data acquisition from the predetermined inspection target reading device belonging to a layer of which the number of hops is the smallest succeeds, the retry control unit retries to acquire the data from the remaining predetermined inspection target reading devices".

"The failure cause analysis unit includes an environment detection unit that detects the measurement unit and the surrounding environment of the inspection target".

REFERENCE SIGNS LIST 1, 1C reading device
2, 2A, 2B, 2C data collection device
3 inspection target unit
4 determination condition display unit
5 determination condition input unit
6, 6B computer
10 wireless slave station
11 measurement unit
12 sensor information analysis unit
13 failure cause analysis unit
20 wireless master station
21 data acquisition unit
22 inspection recording unit
23 UI unit
27 retry control unit

The invention claimed is:

1. An automatic inspection system of a substation, comprising:
a plurality of inspection targets which are each one of an ammeter, voltmeter, pressure gauge, flow meter, level meter, thermometer, hygrometer, solar meter and an anemometer;
a plurality of inspection target reading devices respectively corresponding to each of the plurality of inspection targets, each inspection target reading device including a processor coupled to a sensor, the processor causing the sensor to obtain data from the inspection target and generate measurement data of the inspection target;
a plurality of a wireless slave stations respectively corresponding to each of the inspection target reading devices that performs communication via a wireless network, each wireless slave station is configured to transmit the generated measurement data via the wireless network;
a plurality of display units respectively corresponding to each inspection target configured to display a determination condition of each inspection target, the determination condition is information indicating a range of a normal state of the inspection target;
a determination condition input unit having a camera configured to image the information displayed each display unit, determine the determination condition from the image;

a wireless master station that performs communication with each inspection target reading device via the wireless network;

a computer coupled to the wireless master station, the computer configured to:

acquire the measurement data from each inspection target reading device through the wireless master station, store the acquired measurement data, store determination conditions related to the measurement data, which are from the determination condition input unit, for each inspection target device, superimpose the measurement data and the determination condition on each other and generate graphical information indicating the determination condition and the measurement data and whether the measurement data is within the range of the determination condition, and output the generated graphical information on a display.

2. The automatic inspection system according to claim 1, wherein the wireless network is a multi-hop wireless network, each inspection target reading device further includes a failure cause analysis unit that analyzes a failure cause when an analysis of the analysis unit fails, and the measurement data in association with failure cause information indicating a failure cause is transmitted from the wireless slave station to the wireless master station via the multi-hop wireless network, the data storage unit stores the acquired measurement data when the failure cause information is not associated with the measurement data acquired from each inspection target reading device by the data acquisition unit, and the automatic inspection system further includes a retry control unit that retries to acquire data depending on a type of the failure cause for a predetermined inspection target reading device corresponding to the failure cause information among the inspection target reading devices when the failure cause information is associated with the acquired measurement data.

3. The automatic inspection system according to claim 2, wherein when it is determined that the failure cause is a time-based resolving type failure cause for solving the failure cause with lapse of time, the retry control unit retries to acquire the data from the predetermined inspection target reading device according to a layer of the number of hops from the wireless master station.

4. The automatic inspection system according to claim 3, wherein the retry control unit retires to acquire data from the predetermined inspection target reading device in order from a hierarchy of which the number of hops is the smallest to a hierarchy of which the number of hops is the largest.

5. A method for controlling an automatic inspection system that collects and inspects data from a plurality of inspection targets, which are each one of an ammeter, voltmeter, pressure gauge, flow meter, level meter, thermometer, hygrometer, solar meter and an anemometer, the automatic inspection system including: a plurality of inspection target reading devices respectively corresponding to each of the plurality of inspection targets, each inspection target reading device including a processor coupled to a sensor, a plurality of wireless slave stations respectively corresponding to each of the inspection target reading devices that performs communication via a wireless network, a plurality of display units respectively corresponding to each inspection target configured to display a determination condition of each inspection target, a determination condition input unit having a camera configured to image the information displayed each display unit, the determination condition is information indicating a range of a normal state of the inspection target, the method comprising:

causing, by the processor, the sensor to obtain data from the inspection target and generate measurement data of the inspection target;

transmitting, by each wireless slave station, the generated measurement data via the wireless network;

determining, by the determination condition input unit, the determination condition from the image;

by a computer that is connected to each inspection target reading device via the wireless network:

acquiring the measurement data from each inspection target reading device from the wireless master station via the wireless network;

storing the acquired measurement data in a data storage unit;

storing determination conditions related to the measurement data in a determination condition storage unit, which are from the determination condition input unit, for each inspection target device, superimposing the measurement data and the determination condition on each other and generate graphical information indicating the determination condition and the measurement data and whether the measurement data is within the range of the determination condition; and outputting the generated graphical information on a display.

* * * * *